United States Patent
Pestel

[11] Patent Number: 6,089,251
[45] Date of Patent: Jul. 18, 2000

[54] PNEUMATIC VALVE

[75] Inventor: Dominique Pestel, Courbevoie, France

[73] Assignee: Zodiac International, Issy les Moulineaux, France

[21] Appl. No.: 09/222,748

[22] Filed: Dec. 29, 1998

[30] Foreign Application Priority Data

Jan. 19, 1998 [FR] France ................................. 98 00501

[51] Int. Cl.[7] .................................................. F16K 15/20
[52] U.S. Cl. ................................ 137/234.5; 137/454.6; 137/232; 441/41
[58] Field of Search .................... 441/41; 137/223, 137/232, 234.5, 454.6, 454.2

[56] References Cited

U.S. PATENT DOCUMENTS

| | | | |
|---|---|---|---|
| 1,624,914 | 4/1927 | Beechtel ................................. | 137/232 |
| 3,780,768 | 12/1973 | Soderstrom . | |
| 3,905,387 | 9/1975 | Grant ...................................... | 137/223 |
| 4,004,614 | 1/1977 | Mackal et al. ....................... | 137/232 X |
| 4,015,622 | 4/1977 | Pagani .................................... | 137/223 |
| 4,046,163 | 9/1977 | Novak . | |
| 4,478,587 | 10/1984 | Mackal . | |
| 4,669,498 | 6/1987 | Hansen . | |
| 4,766,628 | 8/1988 | Walker ................................. | 137/232 X |
| 5,306,187 | 4/1994 | Mackal ................................ | 137/232 X |
| 5,915,407 | 6/1999 | West ....................................... | 137/223 |

FOREIGN PATENT DOCUMENTS

| | | | |
|---|---|---|---|
| 2379001 | 8/1978 | France . | |
| 2627839 | 2/1988 | France .................................. | 137/223 |
| 1029497 | 5/1966 | United Kingdom . | |
| 1179468 | 1/1970 | United Kingdom ..................... | 441/41 |

*Primary Examiner*—John Rivell
*Assistant Examiner*—Meredith H. Schoenfeld
*Attorney, Agent, or Firm*—Dean W. Russell; Kilpatrick Stockton LLP

[57] ABSTRACT

Pneumatic valve (1) for an inflatable object such as an inflatable boat, arranged so as to be partially embedded in an aperture (22) in the flexible wall (21) of the inflatable object carrying it and comprising a valve body (2) containing a valve mechanism (1) and two collars (18, 20) like truncated cones surrounding the valve body (2) and gripping between them in a leak-proof manner the portion of the flexible wall (21) peripherally bordering the aperture (22); the two collars (18, 20) belong to two respective rings (17, 19) removably attached to the valve body (2), and sealing means (16) are provided between the lower ring (17) and the valve body (2); thanks to which the valve body (2) can present a transverse dimension approximately identical to that of said aperture (22) of the flexible wall (21) and fitting the valve (2) to or removing it from the flexible wall (21) can be carried out entirely from the exterior of the flexible wall (21).

5 Claims, 1 Drawing Sheet

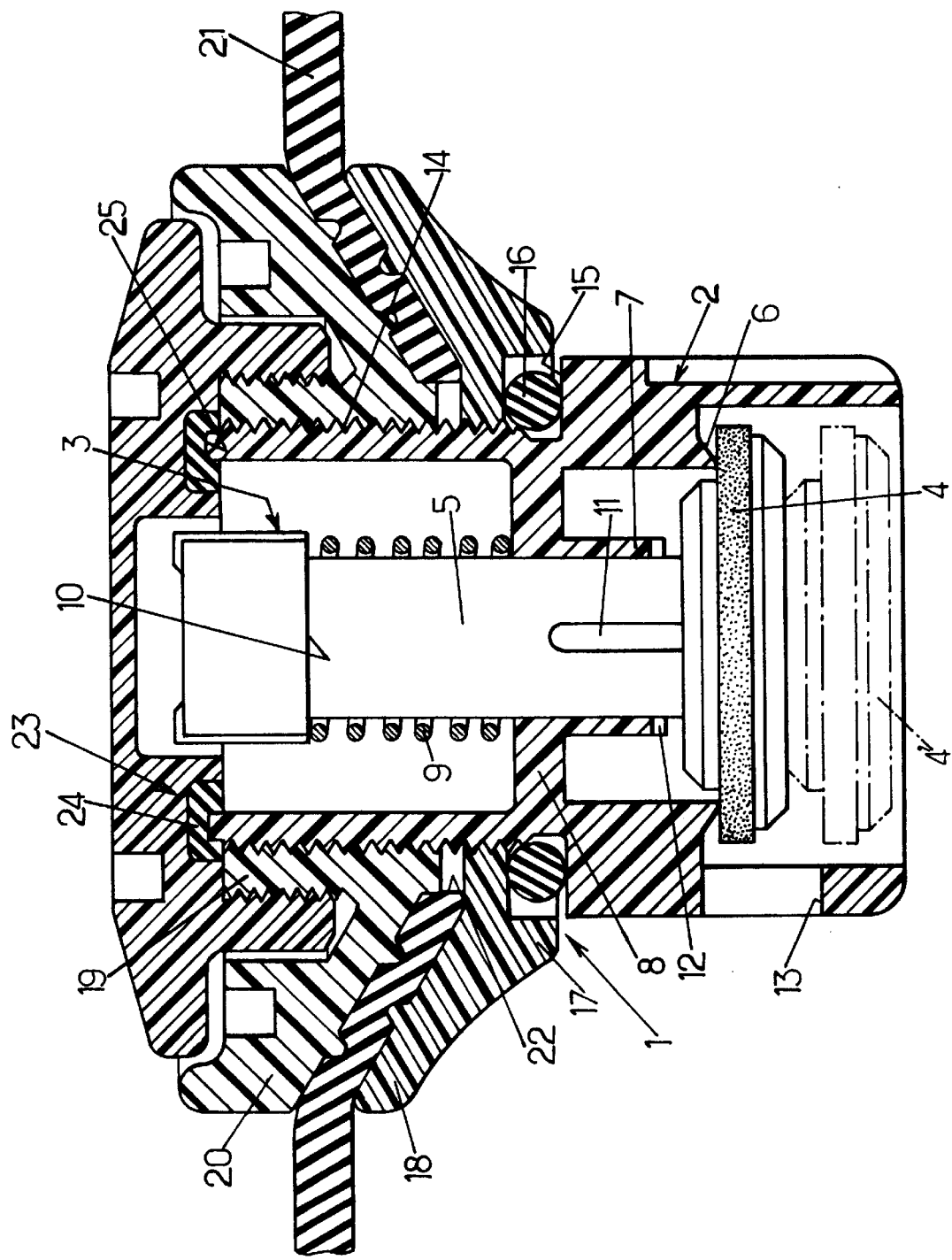

PNEUMATIC VALVE

BACKGROUND OF THE INVENTION

The present invention relates to improvements made to pneumatic valves for an inflatable object such as an inflatable boat, this valve being arranged so as to be partially embedded in an aperture in the flexible wall of the inflatable object carrying it and not protruding significantly in relation to this wall, the valve comprising a valve body containing the valve mechanism and two collars like truncated cones surrounding the valve body, being attached to same and suitable for gripping between them in a leak-proof manner the portion of the flexible wall peripherally bordering said aperture.

Valves of this kind are already known, particularly from the document FR 2 627 839, and are widely used for example to equip inflatable craft of all types.

However, if these known valves give every satisfaction from the functional point of view, they present a significant disadvantage in respect of fitting them on to and removing them from the object which they equip. In fact, the flexible wall intended to support them is fitted with an aperture across it sized to match the transverse dimension of the valve body. Now, in these known valves, the lower collar, intended to come to rest below the flexible wall (i.e. inwardly of the inflatable volume of the object.) is an integral part of the valve body and the diameter of this collar is very significantly greater than the transverse dimension of the aperture across the wall of the object.

The disadvantage can be of less significance during the manufacture of the object for it is possible, at least in numerous cases, to put the valve into place before the inflatable volume is completely closed.

On the other hand, the major difficulty arises when a damaged valve has to be replaced in the course of the object's life: removal of the damaged valve through the aperture, then the introduction of a new valve by the same route prove to be extremely difficult because of the low capacity for elastic deformation, zero in fact, of the material constituting the wall (for example a coated fabric in the case of a craft) and because of the necessity of not distending this material and above all not tearing it.

Essentially, the purpose of the invention is to propose an improved layout of pneumatic valve which, whilst keeping the same structure for the actual valve structure since this gives satisfaction, presents an external configuration making it easier to fit it on to or remove it from the wall of the object which it equips, without this nonetheless resulting in increased complexity, and keeping the cost of manufacturing more or less identical.

SUMMARY OF THE INVENTION

To these ends, a pneumatic valve such as mentioned in the preamble, being arranged according to the invention, is characterised essentially in that the two collars belong to two respective rings removably attached to the valve body which they surround and in that sealing means are provided between the lower ring and the valve body, thanks to which the valve body can present a transverse dimension approximately identical to that of said aperture of the flexible wall and fitting the valve on to or removing it from the flexible wall can be carried out entirely from the exterior of the flexible wall.

In advantageous fashion, the valve body is externally threaded and the two rings are equipped with an internal thread in order to be able to be screwed, the one after the other, on to the valve body.

The improved layout according to the invention proves to be particularly interesting, since the passing of the actual valve body through the aperture no longer presents any major difficulty because of the approximate agreement between the diameter of the valve body and the diameter of the aperture.

As regards the lower collar, a number of solutions may be envisaged: the lower collar can for example be made of a semi-rigid material which allows it to assume a partially oval shape in order to make it pass through the aperture in the wall; or again, the lower collar is made of a rigid material and is introduced into the inflatable volume, before the latter has been created or before it has been completely closed, the collar then being able to be held by some means or other, such as a flexible link, near to the aperture. In all these cases, the operation of replacing a damaged valve becomes very simple and rapid, and the cost of this maintenance operation is significantly reduced at the same time as the risks of damage (non-reversible deformation, tear) to the wall around the aperture are removed.

In a preferred embodiment, the sealing means associated with the lower ring comprise a protruding shoulder surrounding in annular fashion the valve body at the base of its external thread, said shoulder being suitable for serving as a stop for the lower ring screwed on to the valve body, and a sealing ring surrounding the valve body against said shoulder in order to be gripped between the latter and the lower ring screwed down against the latter.

It is equally interesting, in order to ensure ease of mounting of the valve body and to have available the necessary tightening capacity and simultaneously to improve the fastening of the valve cap, to provide for the upper ring to present a central coupling in such a way as to be fitted internally with said internal thread for fitting it on to the valve body and to be fitted additionally with an external thread for mounting a tightly sealing valve cap. Furthermore, the sealing cap comprises advantageously, on its lower face and preferably embedded in an annular groove cut into said face, a sealing ring suitable for coming to rest in a tight seal against the upper edge of the valve body.

BRIEF DESCRIPTION OF THE DRAWINGS

The invention will be better understood in reading the following description of a preferred embodiment given solely by way of non-restrictive example and illustrated in diametric section on the sole FIGURE of the attached drawing.

DETAILED DESCRIPTION OF THE INVENTION

The pneumatic valve illustrated on this FIGURE, referred to in its totality by the reference number 1, comprises a valve body 2 which in general shape is more or less tubular like a cylindrical solid of revolution. In the interior of the body 1 is accommodated a valve mechanism 3 consisting essentially of a clack 4 surmounted by an operating shaft 5 which are roughly coaxial with the body 2. The valve mechanism 3 can be of any layout suitable for guaranteeing any desired function.

The valve body 2 presents internally an annular radial projection 6 which forms a seat on which the clack 4 can sit tightly.

Moreover, the valve body 2 comprises, internally and coaxially, a coupling 7 forming a guide for the operating shaft 5 of the valve mechanism 3. The coupling 7 is joined to the wall of the valve body 2 by a certain number of rays or spokes 8. The coupling 7 and the rays 8 can be formed as one piece with the valve body 2 as shown in the figure, or be formed in the shape of an independent piece attached to the interior of the valve body and fixed in any appropriate manner (for example by screwing) into the latter.

A return spring 9, coaxial with the valve body and surrounding the operating shaft 5, is placed between the coupling 7 and the free end of the operating shaft 5 where it rests on a shoulder 10.

Moreover, the presence will be noted, on the operating shaft 5 in the proximity of the clack 4, of at least one stud 11 (preferably two diametric studs) projecting radially which, after the valve mechanism 3 has been driven in and rotated by about a quarter-turn, comes to rest on the end edge of the coupling 7; this edge can be advantageously equipped with notches 12 in order to keep the stud 11 in this position. The clack 4 is then kept in a position removed from its seat 6, as represented in 4' in dot-dash lines.

If necessary, a plurality of apertures 13 can be provided peripherally in the lower portion of the valve 2, roughly opposite the clack 4 in its open position, in order to facilitate the circulation of the inflating gas (air).

The layout which has just been described has only be presented by way of example and the valve body 2 can equally accommodate a differently configured mechanism.

In its upper portion, the valve body 2 is equipped with an external thread 14 which ends to the right of a shoulder 15 projecting radially outwards and against which a toroidal sealing ring 16 rests.

On this thread is screwed a first ring 17 fitted with a collar 18 like a truncated cone, open upwards. The ring 17 is screwed down against the shoulder 15 gripping the sealing ring 16. Thus the seal, externally to the valve 1, of the interior volume of the inflatable object is assured.

After the first ring, or lower ring, 17 there is screwed on the same thread a second ring, or upper ring, 19 which presents a collar 20 like a truncated cone, likewise open upwards roughly parallel to collar 18.

The opposite faces of collars 18 and 20 grip the annular portion of the flexible wall 21 (for example made of coated fabric) of the inflatable object which surrounds an aperture 22 through which the valve body 2 is engaged. The opposite faces of collars 18 and 20 can present indentations or other raised patterns in order to be effectively attached to the flexible wall 21.

The central portion of the ring 19 can be configured as a coupling in such a way that its internal thread presents a development sufficient to offer mechanical resistance able to give the required tightening force to the wall 21. Furthermore, it becomes possible to equip it likewise with an external thread suitable for mounting a cap or cover 28 intended to close the valve tightly and protect the valve mechanism 3. The cap 23 is provided, on its interior face, with a sealing ring 24 suitable for coming, when the cap is tightened on the ring 19, to a tight fit against the end edge 25 of the valve body 2; the seal 24 can be accommodated in an annular groove cut into the interior face of the cap.

Thanks to this layout, a double tier of sealing is provided which prevents any escape of inflating gas, even in the case of a lack of seal at the level of the clack 4.

The arrangements which have just been described lead to a semi-embeddable pneumatic valve layout, whose deployment and withdrawal are simplified. In fact, the valve body 2 presents a maximumn transverse dimension, to the right of the external shoulder 15, which is approximately identical to, or slightly greater than, the dimension of the aperture 22 made in the wall 21. The valve body 2 can thus be introduced or extracted through the aperture 22 without significant deformation of the latter, and thus without risk of tearing the wall 21.

As far as the first ring 17 is concerned, which co-operates less well with the wall 21, it can be realised in a rigid material and be introduced into the inflatable volume defined by wall 21 during the manufacture of the inflatable object before it is completely closed; it can be held in the proximity of the aperture 22 by means of a flexible link. Another solution can consist in realising ring 17 in a semi-rigid material which allows it to assume a provisional oval shape to permit its introduction into the interior of the object, through aperture 22, from the exterior of the wall 21.

Replacement of a damaged valve can thus be carried out, from the exterior of the inflatable object, in a rapid and thus inexpensive manner.

Furthermore, it will be noted that a valve arranged according to the invention can be used instead of a pre-existing valve of the previous type (complete lower collar with the valve body).

As goes without saying and as already results from what has been said above, the invention is in no way limited to those of its forms of application and embodiment which have been particularly considered; on the contrary, it encompasses all the variants.

What is claimed is:

1. Pneumatic valve for an inflatable object such as an inflatable boat, this valve being arranged so as to be partially embedded in an aperture in the flexible wall of the inflatable object carrying it and not protruding significantly in relation to this wall, the valve comprising a valve body containing the valve mechanism and two collars like truncated cones surrounding the valve body, being attached to same and suitable for gripping between them in a leak-proof manner the portion of the flexible wall peripherally bordering said aperture, wherein the two collars belong to two respective rings; wherein the valve body is externally threaded and the two rings are equipped with an internal thread in order to be able to be screwed, the one after the other, on to the valve body; and wherein sealing means, provided between the lower ring and the valve body, comprise a protruding shoulder surrounding in annular fashion the valve body at the base of its external thread, said shoulder being suitable for serving as a stop for the lower ring screwed on to the valve body, and a sealing ring surrounding the valve body against said shoulder in order to be gripped between the latter and the lower ring screwed down against the latter; whereby the valve body can present a transverse dimension approximately identical to that of said aperture of the flexible wall and fitting the valve on to or removing it from the flexible wall can be carried out entirely from the exterior of the flexible wall.

2. Pneumatic valve according to claim 1, wherein the upper ring is in the form of a coupling in such a way as to be fitted internally with said internal thread for fitting it on to the valve body and to be fitted additionally with an external thread for mounting a tightly sealing valve cap.

3. Pneumatic valve according to claim 2, wherein the sealing cap comprises, on its lower face, a sealing ring suitable for coming to rest tightly against the upper edge of the valve body.

4. Pneumatic valve according to claim 2, wherein the lower ring is made of a semi-rigid material allowing it to assume a provisional oval shape for passing through the aperture of the wall of the inflatable object.

5. A pneumatic valve for an inflatable boat having a flexible wall with an aperture, the valve adapted to be at least partially embedded in the aperture and comprising:

a. an externally-threaded body having a valving mechanism therein and defining a shoulder at the base of the external threads;

b. upper and lower internally-threaded rings removably screwed onto the body, the upper and lower rings defining collars adapted to grip between them in a leak-proof manner a portion of the flexible wall peripherally bordering the aperture; and c. a sealing ring positioned intermediate the lower ring and the shoulder, the sealing ring being gripped between the lower ring and the shoulder when the lower ring is screwed against the shoulder; and wherein the shoulder serves as a stop for the lower ring when the lower ring is screwed onto the body, the body presents a transverse dimension approximately identical to that of the aperture, and the valve can be fitted onto or removed from the flexible wall entirely from the exterior of the flexible wall if desired.

* * * * *